United States Patent [19]
Chen et al.

[11] Patent Number: 6,154,768

[45] Date of Patent: Nov. 28, 2000

[54] SYSTEM AND METHOD FOR NEGOTIATING FUNCTIONS AND FEATURES

[75] Inventors: Qilun Chen, Vestal; Thomas Edwin Murphy, Jr., Binghamton; Paul Francis Rieth, Apalachin; Jeffrey Scott Stevens, Endwell, all of N.Y.

[73] Assignee: International Business Machines Corporation, Armonk, N.Y.

[21] Appl. No.: 09/050,677

[22] Filed: Mar. 30, 1998

[51] Int. Cl.[7] .............................. G06F 15/00; G06F 17/00
[52] U.S. Cl. ...................... 709/203; 709/219; 709/225; 709/227; 709/231; 709/237
[58] Field of Search .................................. 709/203, 227, 709/237, 223, 219, 225, 231

[56] References Cited

U.S. PATENT DOCUMENTS

| | | |
|---|---|---|
| 4,905,282 | 2/1990 | McGlynn et al. |
| 5,774,668 | 6/1998 | Choquier et al. ................. 709/203 |
| 5,790,800 | 8/1998 | Gauven et al. ................... 709/203 |
| 5,835,724 | 11/1998 | Smith ............................. 709/203 |
| 5,922,052 | 7/1999 | Heaton ........................... 709/223 |
| 5,938,731 | 8/1999 | Schreiter ......................... 709/227 |

OTHER PUBLICATIONS

Pitt, J.V., "A World Wide Web interface to agent–based negotiation", Intelligent Agents and Their Applications, IEE Colloquium on (Digest No:1996/101), pp. 8/1–8/3, Apr. 1996.

S. Alexander, ed. Network Working Group, *Telnet Environment Option*, Request for Comments 1572, Jan. 1994, pp. 1–7.

*Primary Examiner*—Frank J. Asta
*Assistant Examiner*—Almari Romero
*Attorney, Agent, or Firm*—Shelley M Beckstrand

[57] ABSTRACT

A system and method for client negotiation of functions and features with a server such as in accordance with RFC 1572 Telnet Environment Option. An interface controller, herein a Java program, is provided which, upon being called by a client application, prompts the application, herein by way of graphical user interface (GUI), for values to be used in the negotiations and, upon obtaining those values, connects to the server negotiates the desired functions and features. Upon completing the functions and features negotiations, the interface controller starts the client application, which connects to the controller and the controller establishes a session with the server. Thereafter, the controller exchanges data streams, herein IBM 5250 data streams, between the server and the client.

14 Claims, 9 Drawing Sheets

| FIG. 8A |
| FIG. 8B |
| FIG. 8C |

FIG. 8B

AS/400 TELNET SERVER (110) — JAVA ADAPTER (116) — TELNET 5250 CLIENT (150)

IAC DO NEW-ENVIRON
IAC DO TERMINAL-TYPE
(Line:29)
218

IAC WILL NEW-ENVIRON
IAC WILL TERMINAL-TYPE
(Line:64,109)
220

IAC SB NEW-ENVIRON
SEND VAR IBMRSEED
XXXXXXXX IAC SE
(Line:29)
222

(Send collected ENVIRON options)
IAC SB NEW-ENVIRON SEND
IBMRSEED XXXXXXXX
DEVNAME LKS001
CODEPAGE 37
CHARSET 697
KEYBOARD USB
USER KCHEN
IBMSUBS XXXXXXXX
IAC SE
(Line:163)
230

IAC SB TERMINAL-TYPE SEND
IAC SE
(Line:29)
232

IAC SB TERMINAL-TYPE IS
IBM-3487-NC IAC SE
(Line:118)
234

SYSTEM AND METHOD FOR NEGOTIATING FUNCTIONS AND FEATURES

CROSS-REFERENCES TO RELATED APPLICATIONS

U.S. patent applications Serial No. 09/050,679, entitled "System and Method for Building and Exchanging Encrypted Passwords Between a Client and Server", and Ser. No. 09/050,678, now U.S. Pat. No. 5,946,465 entitled "Method and System for Recovering System Resources Used by an Inactive Telnet Client", filed concurrently herewith are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention pertains to client and server negotiation of functions and features. In particular, this invention provides a functional interface at the client which initially connects to and conducts features and function negotiations with the server on behalf of the client, and thereafter exchanges data streams between the server and the client.

2. Background Art

Today, most Telnet clients lack the ability to implement RFC 1572 extensions, whereby negotiations with an AS/400 Telnet server occur to establish a specific device type, code page, character set, and so forth, for a desired Telnet connection. The RFC 1572 protocol is described in Network Working Group, *Telnet Environment Option*, Request for Comments 1572, January 1994, the teachings of which are incorporated herein by reference.

In order to take advantage of functions and features negotiations provided by RFC 1572, Telnet clients must be modified. These new functions and features include (1) starting specific jobs based upon the device name; (2) restricting application access based on device name; and (3) selecting terminal and keyboard language information by device selection, because virtual devices have national language support attributes already associated with them.

However, modifications to Telnet clients are neither easy nor trivial. Adding RFC support typically requires some kind of client interface update to perform the negotiation.

It is an object of the invention to provide an improved client interface supporting functions and features negotiations.

It is a further object of the invention to provide a client interface that performs negotiations for device name, code page, character set, and the like on behalf of a Telnet client.

It is a further object of the invention to provide a system and method for enabling RFC 1572 negotiations without having to modify the client to support the new options.

It is a further object of the invention to allow enhanced features provided in a Telnet server to be exploited by traditional (or, legacy) Telnet clients.

SUMMARY OF THE INVENTION

In accordance with the invention, a system and method is provided for client negotiation of functions and features with a server. An interface controller is provided which, upon being called by a client application, prompts the application for values to be used in the negotiations and, upon obtaining those values, connects to the server to negotiates the desired functions and features. Upon completing the functions and features negotiations, the interface controller starts the client application, which connects to the controller and the controller establishes a session with the server. Thereafter, the controller exchanges data streams between the server and the client.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 8A–8C, related as illustrated in FIG. 8, illustrate a more detailed view of the process steps executed by the interface controller of FIG. 5.

BEST MODE FOR CARRYING OUT THE INVENTION

Figure 1:
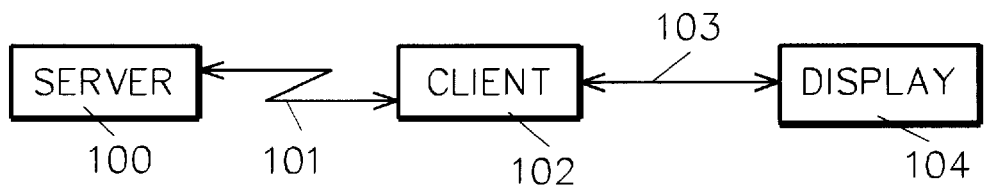
FIG. 1 illustrates a typical server/client connection in accordance with the prior art.

Referring to FIG. 1, in accordance with the prior art, server 100 is connected over a TCP/IP link to client 102, which may be a workstation including a connection 103 to display 104. In accordance with protocols defined in RFC 1572, server 100 and client 102 may negotiate to establish a specific device type, code page, character set, and so forth, for a desired Telnet connection.

Figure 2:
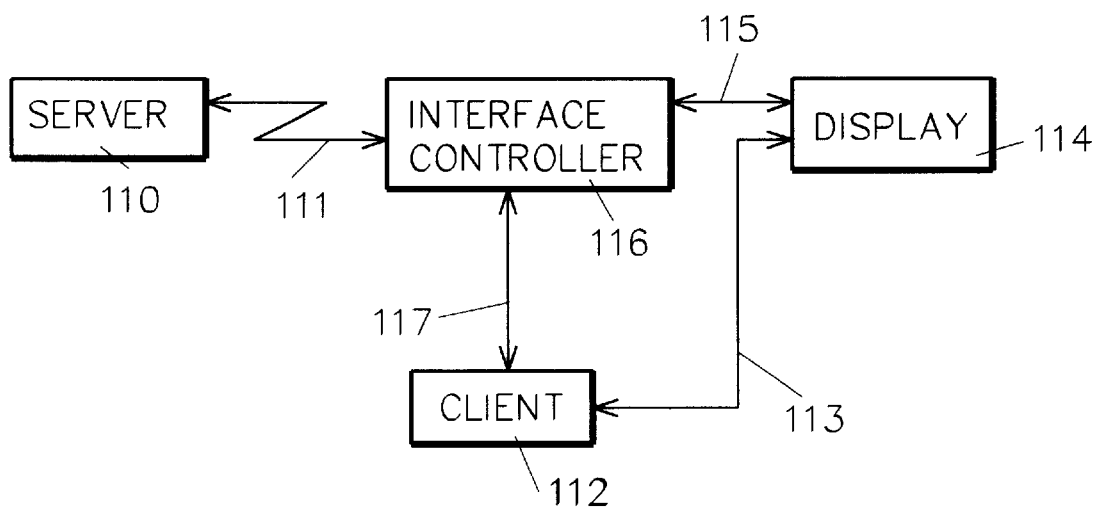
FIG. 2 illustrates an interface controller for interconnecting a server and client in accordance with the invention.

Referring to FIG. 2, in accordance with the invention, client application 112 is connected as represented by interface line 117 to interface controller 116. In this preferred embodiment, interface controller is a Java program with a graphical user interface (GUI) represented by line 115 to display 114, and which connects with server 110 over TCP/IP link 111. Client application 112 is also connected by interface 113 to display 114. Controller 116 sits between client 112 and server 110 and handles protocol negotiations before dropping into the steady state function of passing data between client 112 and server 110. While this preferred embodiment of the invention relates to RFC 1572, similar controllers may be provided for other client/server protocols, such as FTP, HTTP, LPR/LPD, and so forth, in addition to other Telnet RFCs besides 1572.

Figure 3:
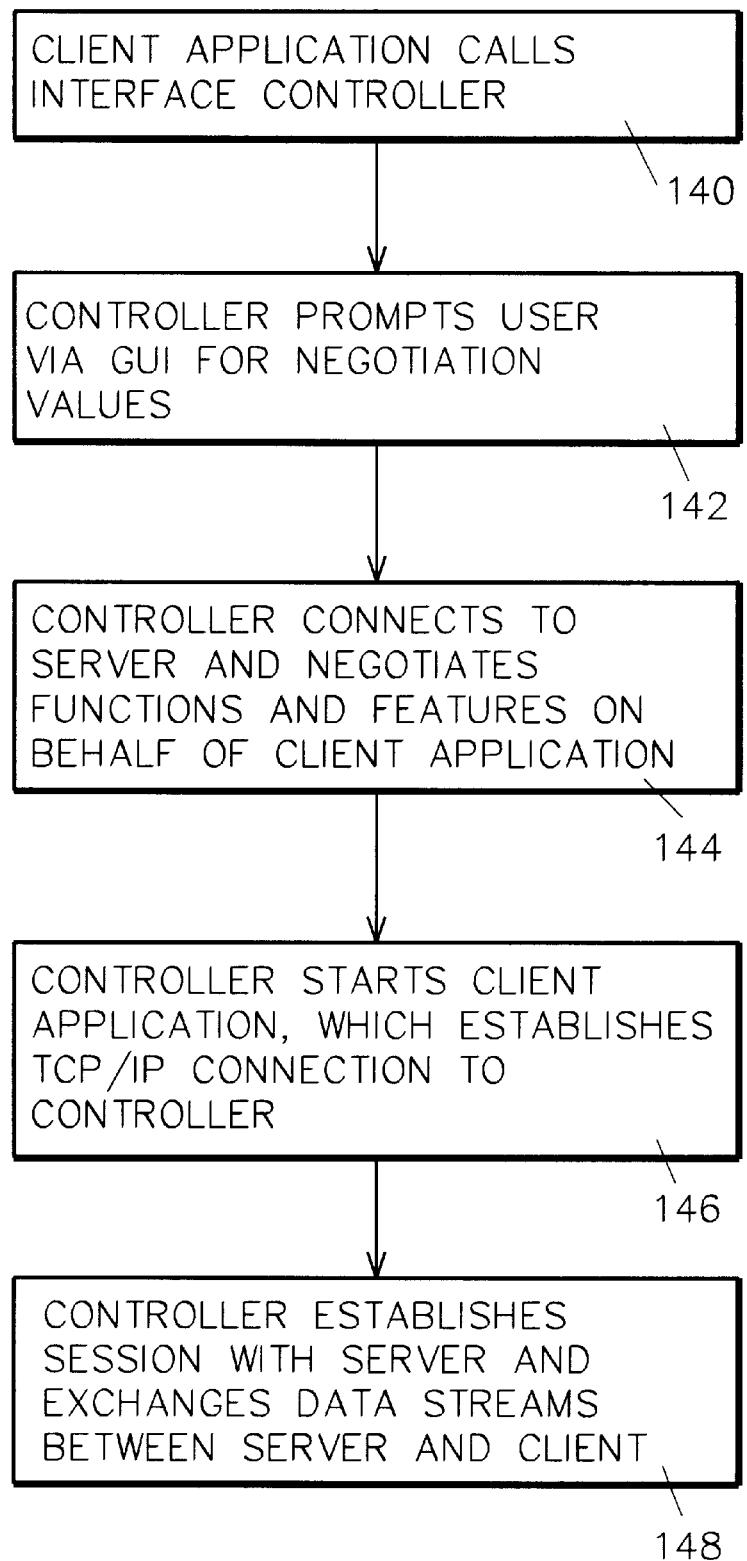
FIG. 3 illustrates a high level view of the process steps executed by the interface controller of FIG. 2.

Referring to FIG. 3, in operation, interface controller 116 performs the negotiations for device name, code page, character set, and so forth on behalf of Telnet client 112, thus enabling the function and features that are possible using RFC 1572 protocols, or the like. In step 140, client application 112 calls interface controller 116 which then in step 142 prompts user via graphical user interface (GUI) presentation at display, 114 as is represented by line 115, for the values to use in the negotiations. These values include, for RFC 1572 negotiations, terminal type, user identifier, password, device name, keyboard type, code page, and character set.

Interface 115 is optional, and provides a flexible version of an interface to controller, or adapter, 116 allowing a user to set negotiation values rather than using fixed values from a file or the like. In this sense, step 142 represents obtaining negotiation values from a GUI interface, a file, from system settings, or so forth. A GUI interface is not explicitly required.

Having obtained the negotiation values from the user at workstation display 114, in step 144 interface controller 116 connects to the server 110 over link 111 to negotiate functions and features on behalf of client 112. In step 146, as is represented by line 117, controller 116 kicks off client application 112 which connects to controller 116 (rather than directly to server 110). "Kick off" means to start a separate job or program. Client 112 runs independently of program 116, and in all embodiments of the invention it is not required that program 116 start client 112. While having client 112 started by controller 116 may be a feature, what is required is that controller 116 start before client 112 can connect to it. At what point controller program 116 connects to server 110 is a design issue, but preferably client 112 provides all values it wants to negotiate with server 110 to controller 116, and controller 116 may add some extra negotiations to that existing negotiation stream. Thus, in accordance with this specific embodiment, client 112 may already be building a negotiation (or, control) stream, and controller program 116 adds additional data into that stream and interprets the reply data from server 110 in response to that additional data.

In a preferred embodiment, client 112 establishes a TCP/IP connection 117 to controller 116 once controller 116 has completed Telnet negotiations with server 110, and client 112 simulates the Telnet negotiations with controller 116 (that is, duplicates the negotiations which have been previously carried out).

In accordance with a further embodiment, negotiation streams from both client 112 and controller program 116 are merged. Thus, program 116 passes thru unchanged all client 112 negotiations, and then adds some of its own negotiations after that. In one preferred approach, program 116 receives a negotiation from client 112, and sends it to server 110 with no modifications. Server 112 replies to program 116, which sends the data unchanged to client 112. This continues until program 116 finds a spot in the thread to insert the extra negotiations. Normally, controller program 116 is waiting for a TERMINAL-TYPE negotiation request per RFC 1091 after which it will insert NEW-ENVIRON negotiations). When all negotiations are complete to the satisfaction of server 110, then server 110 sends a sign-on panel to program 116 which passes it unchanged to client 112. At this point, no more negotiations are needed or planned, and adapter program 116 passes data back and forth between server 110 and client 112 and does no other function.

In step 148 controller 116 establishes a session with server 110 over link 111, which is in this preferred embodiment a TCP/IP link, and exchanges data streams between client 112 and server 110. In this embodiment, data streams between server 110 and client 112 over links 111 and 117 are normal telnet data streams.

Figure 4:
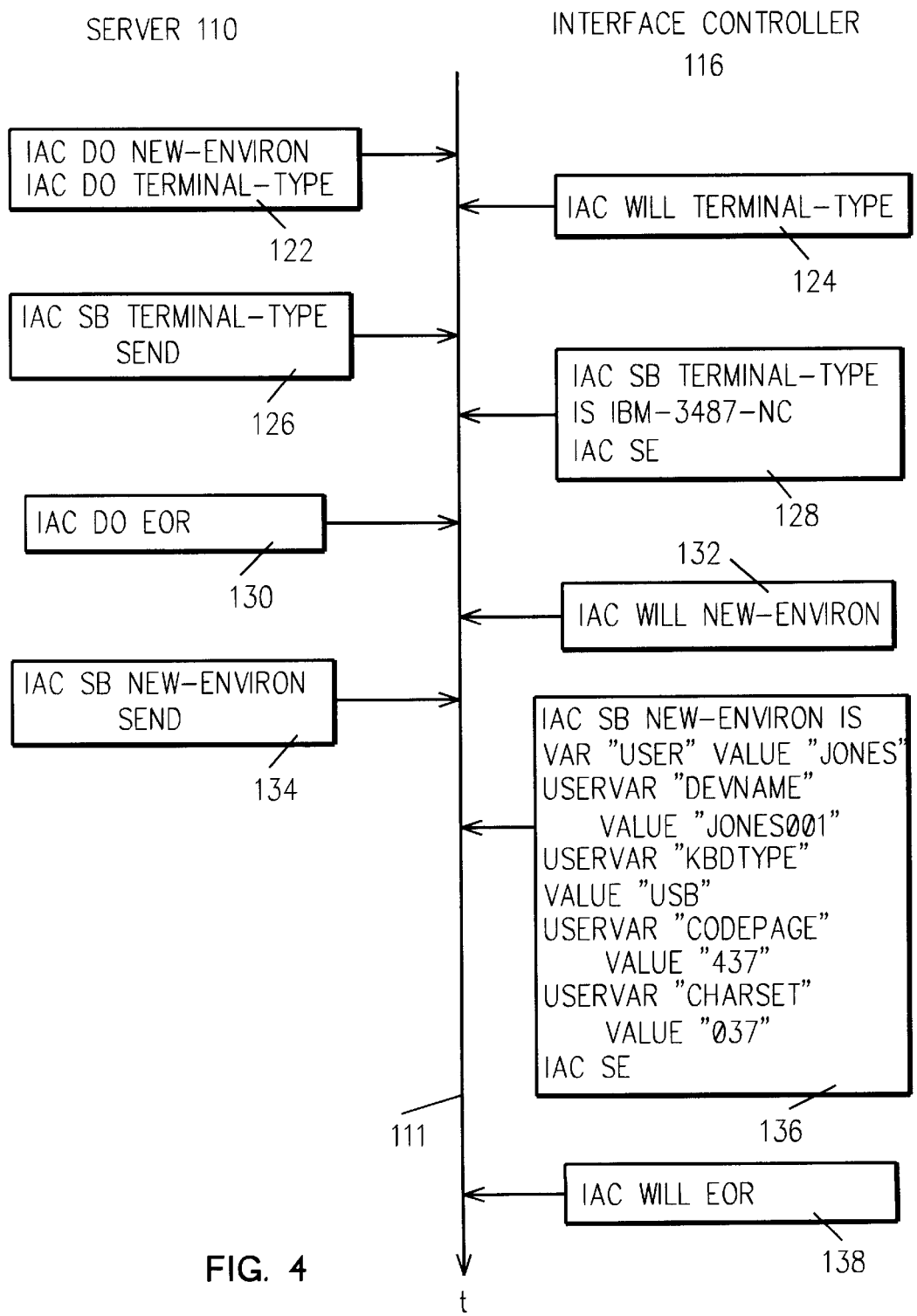
FIG. 4 illustrates the process for negotiating certain functions and features in accordance with RFC 1572.

Referring to FIG. 4, a description of a specific preferred embodiment of the operation of interface controller 116 for executing step 144 is set forth. In this regard, controller 116 makes use of enhancements provided to server 110 to implement RFC 1572 Telnet Environment Option to allow clients to specify the virtual device name of the Telnet session. This is done through the new option negotiation handshaking sequence illustrated in FIG. 4 using the variables set forth in Table 1 Telnet Environment Negotiation Variables. The key here is for Telnet server 110 to inform the Telnet client 112, represented in accordance with this embodiment of the invention by interface controller 116, that a NEW-ENVIRON option can be negotiated. Inasmuch as client 112 is unaware of this option, interface controller obtains the values required for the negotiation from the user at workstation display 114 through a GUI, represented by line 115, and then starts client 112 and drops into a data stream pass through mode between client 112 and server 110.

TABLE 1

TELNET ENVIRONMENT NEGOTIATION VARIABLES

| USERVAR | VALUE | EXAMPLE |
| --- | --- | --- |
| DEVNAME | us-ascii char(x) | QPADEV001 |
| KBDTYPE | us-ascii char(3) | USB |
| CODEPAGE | us-ascii char(y) | 437 |
| CHARSET | us-ascii char(y) | 037 | where
x - up to a maximum of 10 characters
y - up to a maximum of 5 characters

Referring to FIG. 4, server 110 and interface controller 116 are in communication over Telnet link 111, in a time sequence represented by "t". In step 122, Telnet server 110 sends the Telnet command DO TERMINAL-TYPE. In step 124, interface controller responds on behalf of client 122 with WILL TERMINAL-TYPE. In step 126, Telnet server sends the sub-negotiation command for the terminal type option. In step 128, controller 116 responds to the sub-negotiation terminal type command by sending any valid supported terminal type, in this case the IBM-3487-NC. In step 122, server 110 also tests if the Telnet client (in accordance with this invention, represented by controller 116) is capable of handling negotiations using RFC 1572 by sending a DO NEW-ENVIRON command bundled with the DO TERMINAL-TYPE command; alternatively, this DO NEW-ENVIRON command could be sent following step 128. In step 132, controller 116 responds to the deferred NEW-ENVIRON with the Telnet command WILL NEW-ENVIRON (or, if it cannot support RFC 1572, sends WONT NEW ENVIRON), and defers until step 138 responding to the DO EOR request issued by server 110 at step 130. In step 134, server 110 sends the sub-negotiation command for the environment option. In step 136, controller 116 responds by passing up the environment option information secured, at least in part, from the user at display 114 in step 142. Thus, an appropriate value is selected for a particular client environment. That is, for someone on a Japanese personal computer a USERVAR KBDTYPE of VALUE JKB is sent to get Japanese language support set up with the virtual device created at server 110. Or, since devices can be pre-created with Japanese attributes, alternatively a device is selected which is known to support Japanese, such as USERVAR DEVNAME with VALUE JAPAN001. These are two independent ways to select what is appropriate for the client environment, herein to provide Japanese support at server 110 for a Japanese user at Telnet client 112. Thus, server 110 uses the environment information passed from controller 116 in step 136 to select or create a virtual device description for this session. Assuming negotiation of the environment option completes successfully, server 110 and controller 116 proceed in steps 130 and 138 and thereafter with negotiation of the other Telnet options (e.g., End of Record, Binary) required to initiate a Telnet session. Standard Telnet negotiations, such as End-of-Record, Binary, and so forth are passed between server 110 and client 112. In effect, during such standard negotiations, adapter program 116 is not doing the negotiation but rather letting client 112 respond to server 110. Adapter program 116 inserts and interprets enhanced protocol options (those options or capabilities added to the protocol subsequent to the building of the legacy client 112), such as NEW-ENVIRON or any other custom negotiation.

In accordance with the invention, blocks 132, 134 and 136 make it possible for existing clients to support the new RFC 1572 options without having to modify the client.

Figure 5:
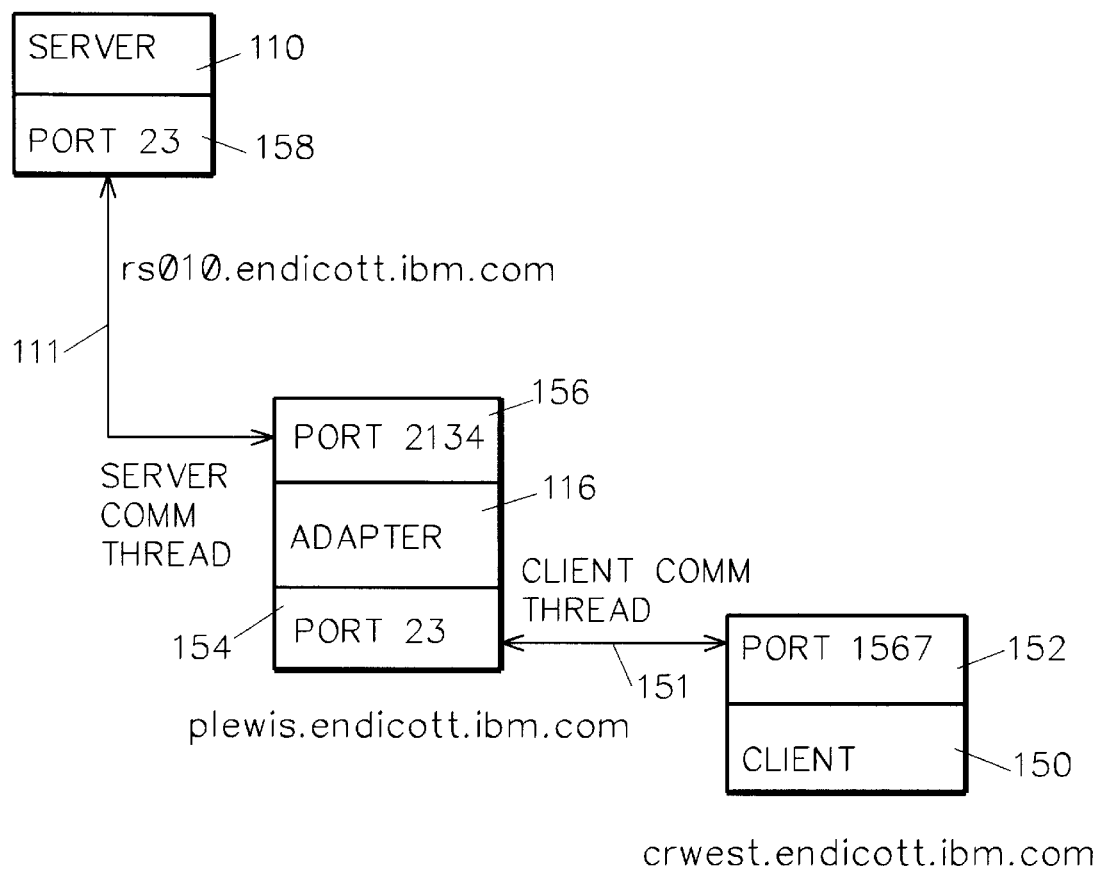
FIG. 5 illustrates the multi-threading structure for the interface controller (or, adapter) of FIG. 2.

Referring to FIG. 5, a specific preferred embodiment of the invention is set forth. Telnet adapter 116 runs between Telnet server 110 and client 150 to enable customers to fully utilize the potential of AS/400 Telnet servers. Telnet 5250 adapter 116 is based, in this specific preferred embodiment, on a Java simulator which, in order to manage all data streams between server and clients, includes a multi-threading structure. Herein, in accordance with that multi-threading structure, server 110 is located at rs010.endicott.ibm.com and is listening on port 158 set to port 23. Adapter 116 is located at plewis.endicott.ibm.com, and is listening on port 156 set to port 2134 and on port 154 set to port 23. Client 150 is located at plewis.endicott.ibm.com and is listening on port 152 set to port 1567.

To run adapter program 116, a user enters "java TN5250Adaptor" on a command line, then uses any Telnet client 150 to to connect to the TN5250Adaptor. For example, if the TN5250Adaptor 116 is running on plewis.endicott.ibm.com, and listening for clients on port 23, then a user on Andrew File System (AFS) or AIX can enter "x5250 -sk plewis.endicott.ibm.com" to log on.

Figure 6:
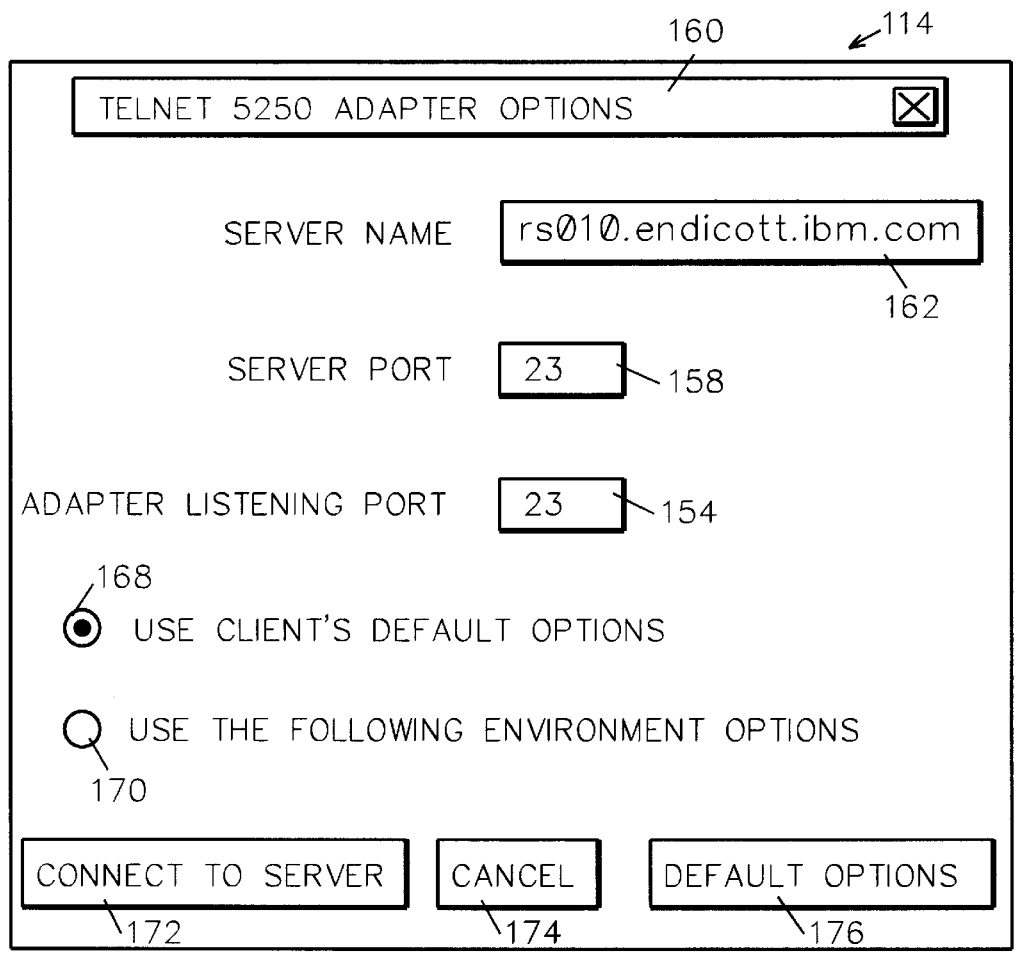
FIG. 6 illustrates a sample screen shot for using the client's default options.

Referring to FIG. 6, a sample screen shot of Telnet 5250 Adapter Options 160 is illustrated as presented to the user at display 114. Server name 162 is set to rs010.endicott.ibm.com, server port 158 is set to value "23" and adapter listening port 154 is set to value "23". With button 168 activated, use client's default options is selected, and TN5250Adaptor 116 wont't do anything special, but rather pass raw data between server 110 and client 150.

Figure 7:
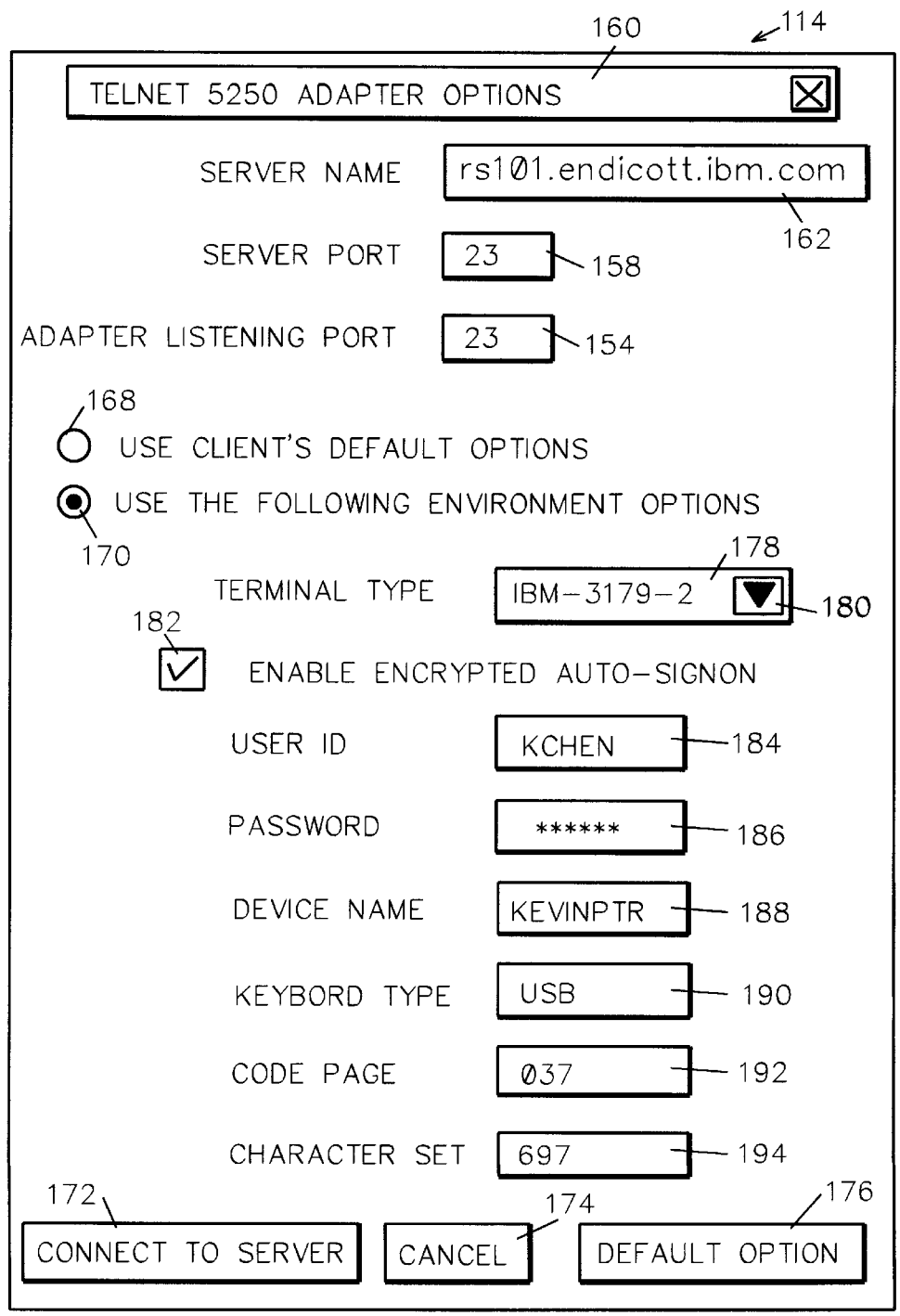
FIG. 7 illustrates a sample screen shot for doing environment option negotiations.

Referring to FIG. 7, with button 170 activated on option panel 160, TN5250Adaptor 116 will first negotiate with client 150 and negotiate all the Telnet options from the client. When client 150 reaches a state which is ready for data packets, TN5250Adaptor 116 negotiates with server 110 and use all the options specified in option panel 160, including server name 162 of "rs101.endicott.ibm.com", server port 158 of "23", terminal type 178 of value "IBM-3179-2" (or another terminal type entered into field 178 or selected from drop down list 180 by the user), password 186, device name 188 of value "KEVINPTR", keyboard type 190 of "USB", code page 192 of "037", and character set 194 of "697" and any other client options that were negotiated. Buttons 172, 174 and 176 may be activated by the user to connect to server, cancel, or select default options, respectively. Selection of button 182 allows encrypted auto-signon which bypasses the signon screen.

By way of example of a specific implementation of the invention, consider a large chain of hospitals with thousands of patient's nurses using handheld wireless devices to read and update patient information stored on a central computer, such as an IBM AS/400 computer, using one of any number of 25,000 applications developed for the AS/400 and Telnet to access the application on the AS/400 across a wide area network (WAN), as distinguished from a local area network (LAN). Since each nurse running an application represents a job running on the AS/400, thousands of jobs constitute significant workload and resource contention on the AS/400, as further described in copending application S/N 09/050, 678, now U.S. Pat. No. 5,946,465, the teachings of which are incorporated herein by reference. In accordance with the present invention, control program 116 provides for selection of the device name used by the nurse (nurse name or ID number). Assuming the nurse is Miss Jones, then in step 136 adapter program 116 inserts into the data stream (or, server communication thread) to server 110, the following:

VAR USER VALUE JONES

USERVAR DEVNAME VALUE JONES001

This allows a nurse to use a specific virtual display device name on server 110, thus enabling server 110 to make that virtual display device "in use" and not capable of reuse until after termination of a user job, thus preventing the nurse who loses her connection from being locked out from using her virtual display device for what could be an unreasonable amount of time.

Figures 8, 8A:
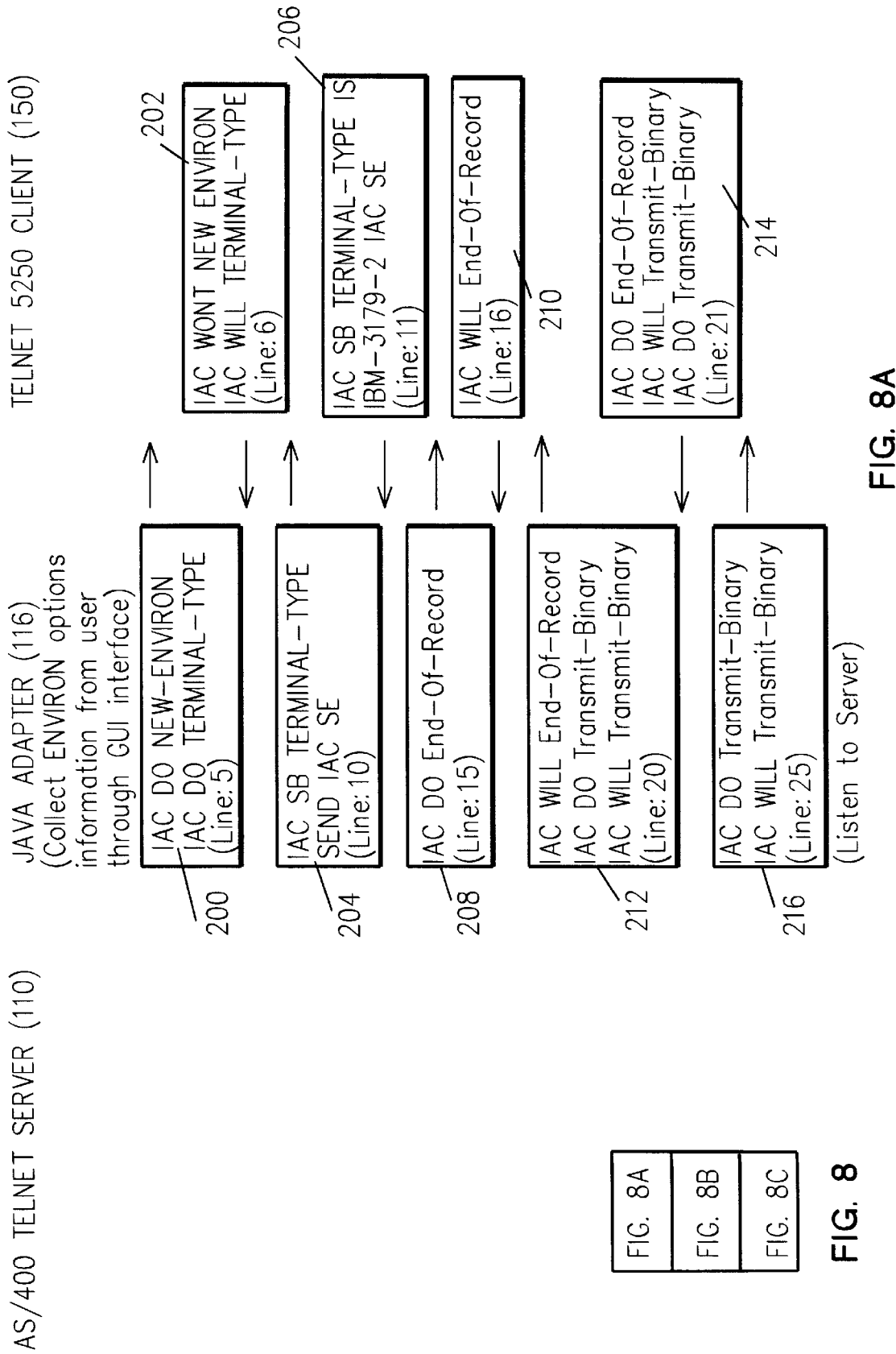
Figure 8C:
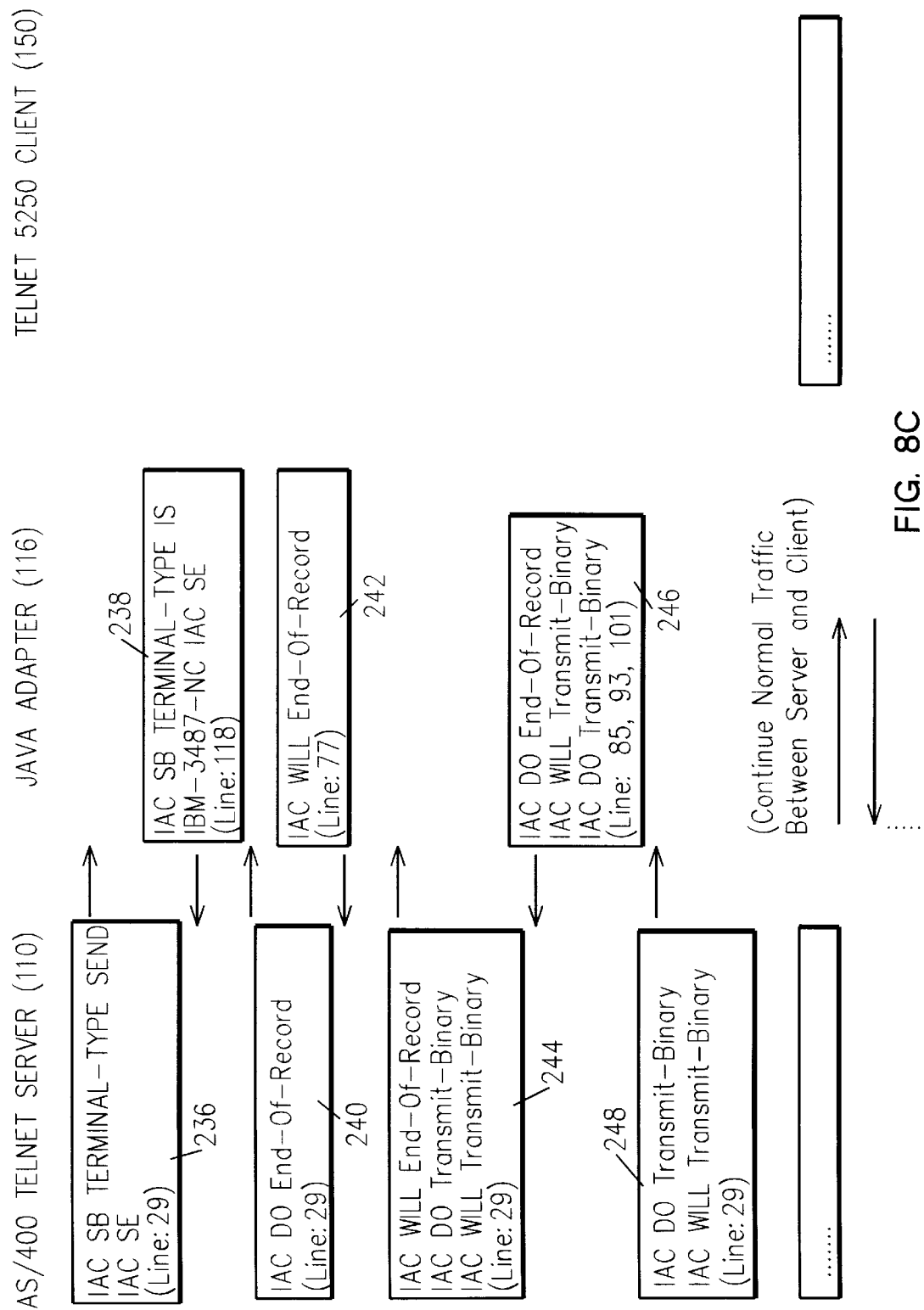

Referring to FIGS. 8A and 8B in connection with Table 2, the portion of Java source code that performs the negotiation with server and client in accordance with a preferred embodiment of the invention is provided. Line numbers in blocks 200 through 248 refer to the line numbers in Java source code Table 2.

TABLE 2

OPTION NEGOTIATION

```
parent.displaySaveLog(newline + "**** Environment Option
Negotiation with Client ***" + newline);
line="\377\375\047\377\375\030";   //IAC DO NEW-ENVIRON IAC
tempBuf = line.getBytes();          // DO TERMINAL-TYPE
ClientOut.write(tempBuf);
length = ClientIn.read(ClientBuf);
parent.printBuf(16, ClientBuf, 0, length; "C->A: ");
line="\377\372\030\001\377\360";   //IAC SB TERMINAL-TYPE
tempBuf = line.getBytes();          // SEND IAC SE
ClientOut.write(tempBuf);
length = ClientIn.read(ClientBuf);
parent.printBuf(16, ClientBuf, 0, length, "C->A: ");
line="\377\375\031";                //IAC DO END-OF-RECORD
tempBuf = line.getBytes();
ClientOut.write(tempBuf);
length = ClientIn.read(ClientBuf);
parent.printBuf(16, ClientBuf, 0, length, "C->A: ");
line="\377\373\031\377\375\00\377\373\000";  //IAC WILL END-OF-
tempBuf = line.getBytes();           // RECORD IAC DO TRANSMIT-
                                     BINARY IAC
ClientOut.write(tempBuf);            // WILL TRANSMIT-BINARY
length = ClientIn.read(ClientBuf);
parent.printBuf(16, ClientBuf, 0, length, "C->A: ");
line="\377\375\000\377\373\000";   //IAC DO TRANSMIT-
                                     BINARY IAC
tempBuf = line.getBytes();           // WILL TRANSMIT-BINARY
ClientOut.write(tempBuf);
parent.displaySaveLog(newline + "**** Environment Option
Negotiation with Server ***" + newline);
while(true) {
  length=ServerIn.read(ServerBuf);
  if (length == -1) {
    parent.displaySaveLog("Connection closed by server. "+
    newline);
    break;
  }
  for(int i=0;i<length;i++) {
    int head = (ServerBuf[i] & 0xFF);
    head <<= 8;
```

TABLE 2-continued

OPTION NEGOTIATION

```
    head |= (ServerBuf[i+1] & 0xFF);
    head <<= 8;
    head |= (ServerBuf[i+2] & 0xFF);
    head &= 0xFFFFFF;
    if (!completed) {
      head = 0x12A0;
      gotSoFar += length;
    } else if ((length - i) > 4) {
      if ((( ServerBuf[i+2] == (byte) 0x12) &&
          (ServerBuf[i+3] == (byte) 0xa0))  {
        packetLen = ServerBuf[i];
        packetLen <<= 8;
        packetLen |= (ServerBuf[i+1] & 0xFF);
        packetLen &= 0xFFFF;
        gotSoFar = length - 2;
        head = 0x12A0;
      }
    }
  }
  if (!parent.myProfile.useOptions) {
    head = 0xFFFFFFFF;   // to skip to the default case
  }
  switch (head) {
    case 0xFFFD27:        // IAC DO NEW-ENVIRON
      parent.printBuf(16, ServerBuf, i, 3, "S->A: ");
      if (parent.myProfile.useOptions    //IAC WILL NEW-
                                           ENVIRON
          && parent.myProfile.AutoSignon) {
        line="\377\373" + (char) ServerBuf[i+2];
      } else {                           //IAC WONT NEW-
                                           ENVIRON
        line="\377\374" + (char) ServerBuf[i+2];
      }
      tempBuf = line.getBytes();
      sendtoServer(16, tempBuf, 0, line.length(), "A->S: " );
      i+=2;
      replied = true;
      break;
    case 0xFFFD19:        // IAC DO END-OF-RECORD
      parent.printBuf(16, ServerBuf, i, 3, "S->A: ");
      line="\377\373" + (char) ServerBuf[i+2];   //IAC WILL
      tempBuf = line.getBytes();          // END-OF-RECORD
      sendtoServer(16, tempBuf, 0, line.length(), "A->S: " );
      i+=2;
      replied = true;
      break;
    case 0xFFFB19:        // IAC WILL END-OF-RECORD
      parent.printBuf(16, ServerBuf, i, 3, "S->A: ");
      line="\377\375" + (char) ServerBuf[i+2];   //IAC DO
      tempBuf = line.getBytes();    // END-OF-RECORD
      sendtoServer(16, tempBuf, 0, line.length(), "A->S: " );
      i+=2;
      replied = true;
      break;
    case 0xFFFD00:        // IAC DO TRANSMIT-BINARY
      parent.printBuf(16, ServerBuf, i, 3, "S->A: ");
      line="\377\373" + (char) ServerBuf[i+2];   //IAC WILL
      tempBuf = line.getBytes();    // TRANSMIT-BINARY
      sendtoServer(16, tempBuf, 0, line.length(), "A->S: " );
      i+=2;
      replied = true;
      break;
    case 0xFFFB00:        // IAC WILL TRANSMIT-BINARY
      parent.printBuf(16, ServerBuf, i, 3, "S->A: ");
      line="\377\375" + (char) ServerBuf[i+2];   //IAC DO
      tempBuf = line.getBytes();    // TRANSMIT-BINARY
      sendtoServer(16, tempBuf, 0, line.length(), "A->S: " );
      i+=2;
      replied = true;
      break;
    case 0xFFFD18:        // IAC DO TERMINAL-TYPE
      parent.printBuf(16, ServerBuf, i, 3, "S->A: ");
      line="\377\373" + (char) ServerBuf[i+2];   //IAC WILL
      tempBuf = line.getBytes();    // TERMINAL-TYPE
      sendtoServer(16, tempBuf, 0, line.length(), "A->S: " );
      i+=2;
      replied = true;
      break;
    case 0xfffa18:        // IAC SB TERMINAL-TYPE SEND
                                           IAC SE
      parent.printBuf(16, ServerBuf, i, 3, "S->A: ");
      line = "\377\372\030\000" + parent.myProfile.TermType +
          "\377\360";                    //IAC SB TERMINAL-TYPE IS
      tempBuf = line.getBytes();   // IBM-3487-NC IAC SE
      sendtoServer(16, tempBuf, 0, line.length(), "A->S: " );
      i+=5;
      break;
    case 0xfffa27:        //IAC SB NEW-ENVIRON SEND
                                           VAR IBMRSEED
      parent.printBuf(16, ServerBuf, i, length-i, "S->A: ");
      long PWSEQs  = 1;          // XXXXXXXX IAC SE
      long RDr     = 0x7b67ac70b700006bL;
      long RDs     = 0x000000004ecae933L;
      RDr = 0;
      for (int j = 0; j < 8; j++) {
        RDr <<= 8;
        RDr |= (ServerBuf[i+13+j]   & 0xff);
      }
      long PWS = PWSUBS.GetPasswordSubstitude
          (parent.myProfile.password,
           parent.myProfile.id,
           PWSEQS,
           Rdr,
           RDs);
      String PWSstring = parent.escapeFilter2(PWS);
      String RDSstring = parent.escapeFilter2(RDs);
      line="\377\372\047\000\003IBMRSEED\001" + RDsstring;
      if (parent.myProfile.ch_devname)
        line+="\003DEVNAME\001"+ parent.myProfile.devname;
      if (parent.myProfile.ch_codepage)
        line+="\003CODEPAGE\001" + parent.myProfile.codepage;
      if (parent.myProfile.ch_charset)
        line+="\003CHARSET\001" + parent.myProfile.charset;
      if (parent.myProfile.ch_kbdtype)
        line+="\003KBDTYPE\001" + parent.myProfile.kbdtype;
      if (parent.myProfile.ch_id)
        line+="\000USER\001" + parent.myProfile.id;
      if (parent.myProfile.ch_password)
        line+="\003IBMSUBSPW\001" + PWSstring;
      line+="\377\360";
      // IAC SB NEW-ENVIRON SEND
      // IBMRSEED XXXXXXXX
      // DEVNAME LKS001
      // CODEPAGE 37
      // CHARSET 697
      // KEYBOARD USB
      // USER KCHEN
      // IBMSUBS XXXXXXXX
      // IAC SE
      tempBuf = line.getBytes();
      sendtoServer(16, tempBuf, 0, line.length(), "A->S: " );
      i = length;
      break;
    default:                 //PASS NORMAL TELNET DATA TO
                                           CLIENT
      sendtoClient(17, ServerBuf, i, length-i, "S->C: " );
      i=length;
      break;
    }    //switch
  }   // for i
}    //while loop
```

Advantages over the Prior Art

It is an advantage of the method of the preferred embodiment of this invention that new Telnet server functions may be released independently of requiring new Telnet client function. In fact, other types of servers can do similar support for similar clients, this is not necessarily limited to Telnet. This can be a significant cost savings for customers with many clients, and many kinds of clients, which all connect to a single server. They need only get new server code (perhaps for free or as an upgrade) and do not have to pay for client licenses or upgrade costs.

It is a further advantage of the invention that flexibility is provided to extend negotiations as desired, and such need not be limited to language or device possibilities. As long as server support is shipped and the adapter program is used to communicate with the new support, the client side needs have nothing done and customers acquire function for no cost. (In this specific embodiment, adapter 116 may reside at server 110.)

Alternative Embodiments

A first complementary embodiment of this invention comprises a programmed general purpose computer. Such a computer is a well known article of commerce, such as the model AS/400 of the International Business Machines Corporation (IBM) or the System/390 of IBM, and is not described further.

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for negotiating standard features and new features characterizing a client connection with a server, comprising the steps of:

first operating an interface controller to prompt said client for values to use in negotiating said new features;

operating said interface controller to connect to said server;

in virtual negotiation mode, second operating said interface controller responsive to said values to negotiate said new features with said server on behalf of said client;

in standard negotiation mode, operating said interface controller to pass through client feature negotiations without modification to said server; and operating said interface controller to establish a session with said server and exchange data streams between said client and said server.

2. The method of claim 1, wherein the step of operating an interface controller to prompt said client comprises the steps of establishing a graphical user interface at a user terminal, and receiving said values from user input at said interface.

3. The method of claim 1, wherein said values include one or more values from the set comprising terminal type, user identifier, password, device name, keyboard type, code page, and character set.

4. An interface controller for connecting a legacy client to a server capable of supporting new features and standard features, comprising:

means for prompting said client for values to use in negotiating said new features;

means for connecting to said server;

means responsive to said values for negotiating said features with said server on behalf of said client and for passing through without modification negotiations for said standard features; and means for establishing a session with said server and exchanging data streams between said client and said server.

5. The interface controller of claim 4, further comprising means for establishing a graphical user interface at a user terminal, and receiving said values from user input at said interface.

6. A program storage device readable by a machine, tangibly embodying a program of instructions executable by a machine to perform method steps for negotiating new features and standard features characterizing a client connection with a server, said method steps comprising:

operating an interface controller to prompt said client for values to use in negotiating said new features;

operating said interface controller to connect to said server;

in virtual negotiation mode, operating said interface controller responsive to said values to negotiate said new features with said server on behalf of said client;

in standard negotiation mode, operating said interface controller to pass through client feature negotiations without modification to said server; and operating said interface controller to establish a session with said server and exchange data streams between said client and said server.

7. An article of manufacture comprising a computer useable medium having computer readable program code means embodied therein for negotiating new features and standard features characterizing a client connection with a server, the computer readable program means in said article of manufacture comprising:

computer readable program code means for causing a computer to effect prompting said client for values to use in negotiating said new features;

computer readable program code means for causing a computer to effect connecting said controller to said server;

computer readable program code means for causing a computer responsive to said values to effect negotiating said new features with said server on behalf of said client and to pass through without modification client/server negotiations of said standard features; and computer readable program means for causing a computer to effect establishing a session with said server and exchanging data streams between said client and said server.

8. Method for negotiating new features and standard features characterizing a client connection with a server, comprising the steps of:

operating said client to establish a control stream for negotiating said standard features with said server;

operating an interface controller to prompt said client for values to use in negotiating said new features;

operating said interface controller responsive to said values to merge into said control stream said values for negotiating said new features with said server on behalf of said client while passing through without modification in said control stream negotiations of said standard features; and thereafter operating said interface controller to exchange data streams between said client and said server.

9. Controller for negotiating a virtual device name for a nursing data input device connected over a wide-area network with a server for maintaining at said server a database of medical information regarding a patient, comprising:

means for operating said nursing data input device to establish a pass-through control stream for enabling said server and said device to negotiate standard features;

an interface controller for prompting said nursing data input device for values to use in negotiating new features, said new features including said virtual device name;

said interface controller being responsive to said values for merging into said pass-through control stream said values for negotiating said second features with said server on behalf of said nursing data input device; and thereafter for exchanging data streams between said nursing data input device and said server.

10. A program storage device readable by a machine, tangibly embodying a program of instructions executable by a machine to perform method steps for negotiating new features and standard features characterizing a legacy client connection with a server capable of supporting said new features, said method steps comprising:

operating said client to establish a control stream for negotiating said standard features with said server;

operating an interface controller to prompt said client for values to use in negotiating said new features;

operating said interface controller responsive to said values to merge into said control stream said values for negotiating said new features with said server on behalf of said client while enabling said client and server to directly negotiate said standard features; and thereafter operating said interface controller to exchange data streams between said client and said server.

11. The method of claim 1, wherein the step of operating an interface controller to prompt said client comprises the steps of selectively receiving said values from user input at said interface, a file, or system settings.

12. The method of claim 1, said first operating step including negotiating said new features with said client, and said second operating step including duplicating the negotiations of said first operating step to negotiate said new features with said server.

13. The interface controller of claim 4, said means for prompting including means for selectively obtaining said values from a graphical user interface, a file, or system settings.

14. The interface controller of claim 4, said means for negotiating including means for first negotiating said new features with said client and thereafter for negotiating on behalf of said client said new features with said server while passing through without alteration client/server negotiation of said standard features.

* * * * *